Aug. 16, 1938.   T. A. HAMMOND   2,126,770
AIR INFLATING DEVICE
Filed Feb. 21, 1935
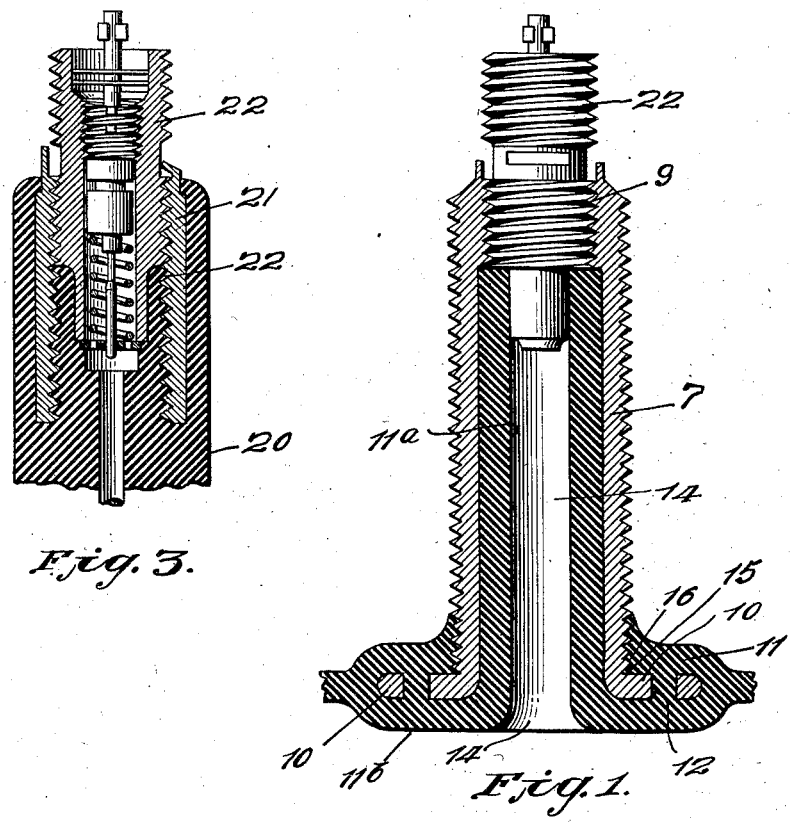
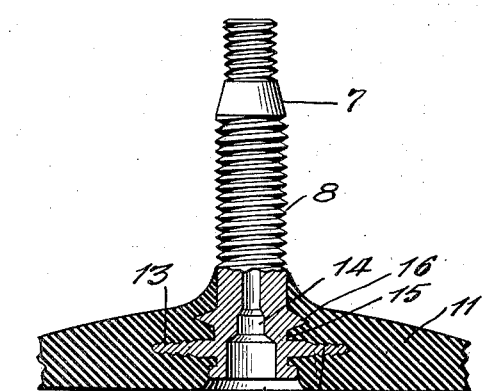
INVENTOR.
Theodore A. Hammond
BY
ATTORNEY.

Patented Aug. 16, 1938

2,126,770

UNITED STATES PATENT OFFICE 2,126,770

AIR-INFLATING DEVICE

Theodore A. Hammond, Montclair, N. J.

Application February 21, 1935, Serial No. 7,505

2 Claims. (Cl. 152—429)

This invention, which forms a part of the original disclosure of my co-pending application Serial No. 673,832, filed June 1, 1933, of which this application is a continuation-in-part, relates generally to valve constructions and is more especially directed to valves of those types which are employed in conjunction with air-inflatable devices, as automotive vehicle tires, so-called air cushions, flotation media and the like.

While my invention, as will become manifest from the following description, is susceptible of a wide range of application in the manufacture and use of air-inflatable devices for various purposes, in this disclosure, I have elected to treat it more or less specifically, as it may be practiced in the production of valves such as are used in motor-vehicle tires and the so-called conventional inner tubes therefor. It will be understood, however, that this is merely illustrative and is not to be construed in any sense as a limitation of the scope of utility of my invention.

As is well known, heretofore, in associating valves with such inner tubes, the wall of the tube surrounding the aperture through which the shoe of the valve casing or stem is inserted within the tube, is clamped between the shoe and a cooperating plate or nut threaded upon the valve stem to provide an hermetic jointure between the tube wall and the stem. The metal to rubber contact in this mode of connection, has been open to numerous objections, because of the non-dependability with respect to permanency. For instance, the nuts whereby the valve stem or casing is drawn into engagement with the wheel rim, in mounting a tire, frequently become loosened, permitting the tube to creep within the tire, with possible tearing or other damage to the tube wall. Again, such loosening of the rim-engaging nut, may result in a relaxation of the clamping effort effective upon the tube wall, with the consequent impairment of the jointure between the valve stem and the tube, the security of the jointure being otherwise detrimentally affected by the contraction and expansion of the metal elements thereof and the heating and concomitant softening of the rubber, in the road service of a tire.

Therefore, it is the primary object of my invention to provide a method and means of eliminating the disadvantages which reside in existing methods of applying valves to air-inflatable devices, and especially inner tubes for vehicle tires, which may be practiced in a simple and economical manner.

It is a further object of my invention to provide a method and means of producing a valve structure for air-inflatable devices, capable of association with a container of flexible material, in such a way that said valve structure will become an integral part of the container, with all of the advantages that flow from an homogeneous construction, in resisting the detrimental forces to which it is normally subjected in use.

Another important object of my invention is the provision of a method of constructing a valve element for an air-inflatable device, by inseparably uniting a metal valve stem or casing with an elastic material to form a unitary structure, the elastic material embracing spaced surfaces of the stem or casing and functioning as an attaching medium, whereby the element may be integrally joined to an air-inflatable device.

More specifically, it is the object of this invention to provide a method and means of encompassing a more practical and durable connection of the valve element to an inner tube for a vehicle tire, than is possible with methods now extant, the conventional externally threaded type of metal valve stem or casing being joined to the tube by a flexible medium to produce, in effect, a unitary structure of which the stem is a component. By practicing my invention, I am enabled to obviate the recognized shortcomings of other modes of attachment of the valve to the tube, especially those wherein the valve stem is interlocked with the tube wall by clamping effort of cooperating metal parts. My valve unit, joined to the tube, as described, meets the demand for a so-called one-piece tube and valve and the inseparable or integral union of the metal stem with the rubber, or elastic material, which forms the attaching portion of the unit, together with the method of jointure of the attaching portion to the tube wall, contribute to a construction which possesses unusual durability, as a whole, and one that is highly resistant to weather conditions and to chafing and strain at the rim aperture, through which the stem portion of the unit protrudes when the tube is functioning within a tire.

Other objects and advantages flowing from the practicing of my invention will doubtless present themselves as the description proceeds and I would have it clearly understood that I reserve unto myself all rights to the full range of equivalents to which I may be entitled, both in structure and in use.

In the drawing, I have shown certain preferred embodiments of my invention, as they may be produced by the use of my herein described method. However, my invention may take other forms, or may be applied in other ways than illustrated, within the purview of the appended claims.

In the drawing:

Figure 1 is a sectional elevation of a valve unit produced in accordance with my invention.

Figure 2 is a view similar to Figure 1, showing a modified form of metal valve stem and a variation in the method of associating the rubber section of the unit therewith, in conformity with my invention, and Figure 3 is a further modification of the valve unit, in which the metal casing of the conventional type shown in the preceding figures, is dispensed with to provide a flexible stem, in which a fitting is embedded, or partially embedded to receive the appropriate valve mechanism.

Referring now to the drawing in detail, in which like characters of reference are employed to designate similar parts in the several views, and more particularly to the invention as shown in Figures 1 and 2, the casing 7 of the valve unit, formed of metal, as in standard practice, and externally and internally threaded as at 8 and 9, is provided with a flange 10 at or adjacent to its lower end, which is adapted to be embedded in the rubber or elastic material, or other suitable flexible, indicated at 11, of which the valve unit attaching portion is produced.

In the form of the invention shown in Figure 1, the aforesaid flange 10 is perforated or apertured at preferably equi-distant radial points, as at 12, while in the modified structure of Figure 2, the flange 10 is corrugated or otherwise formed for interlocking engagement with the rubber or elastic mass, as by providing concentric ridges and depressions on its opposite surfaces, or on one of them, as may be required or dictated by production and usage demands. The interlocking surfaces are indicated at 13 and it will be observed that in this embodiment of my invention, as in the preferred form of Figure 1, the flange 10 is entirely embraced by or embedded in the rubber or elastic material 11, the rubber adhering to the opposite surfaces of the flange and filling the depressions to form a permanent interlock between the two unlike materials. Likewise, the elastic material covers the opposite surfaces of the flange 10 of the form of the invention shown in Figure 1, the mass interlocking with the metal through the openings or apertures 12 therein.

As will be noted, the rubber mass 11 is applied to or associated with the stem or casing 7 in surrounding engagement with the stem above the aforesaid flange 10 and extends below the base of the stem to provide a surface of a greater circumferential area than the flange 10 which is adapted to be superposed upon or applied to the outer surface of the wall of a tube or other air-inflatable device, for permanent jointure thereto, as hereinafter described, the passage through the valve stem being continued through the mass of rubber or elastic material, below the flange 10, as indicated at 14.

In the association of the elastic material with the outer wall of the valve stem, above the flange 10, as above pointed out, the material interlocks with the surfaces 15 and 16, the latter defining the former which may be termed the inset portions of the wall, to distinguish from the portions which protrude outwardly thereof. Obviously, this interengagement of the rubber and metal in a wall zone of the stem presents an area that is highly resistant to separating or rending forces applied in the general direction of the longitudinal axis of the valve unit, and, in cooperation with the interlocking of the flange 10 with the elastic mass, provides a union of the unlike materials which possesses all of the attributes of a homogeneous construction.

If desired, the rubber mass may be extended upwardly within the valve stem 7, as indicated at 11a, in Figure 1 so that the upper end of this extension may cooperate with the cage of a valve mechanism, such as disclosed in my aforesaid copending application, in the attainment of a leak-proof joint between the stem and the valve mechanism carrier. Of course, other forms of valve mechanism may be utilized with this extension with the same advantages.

In the production of the valve unit of my invention, the stem or casing is produced in the desired form, with the base flange 10 and the cooperating interlocking surfaces 15 and 16, or their equivalents, on the wall section and is then ready for the application of the rubber or elastic mass thereto. Assuming that the attaching part of the valve unit is formed of rubber, the latter material may be suitably molded in the requisite form and dimensions and its union with the metal effected by any of the well-known processes employed for such purposes, or the casing or stem may be united to the rubber, by superposing it upon a vulcanizable surface and applying a coating or quantity of green stock thereto in the requisite thickness to form the unit base, and then submitting the whole to vulcanization to form a homogeneous mass of which the metal stem becomes an integral part or component. Manifestly, the rubber base, that is the bottom surface 11b of the attaching portion 11 of the valve unit, which spaces the lower end of the valve stem from the tube wall, or the defining edge of the valve passage orifice therein, is cemented or vulcanized to the tube by any appropriate process, the passage 14 through the valve casing and the elastic attaching base, communicating with the interior of the tube. With the valve unit integrally joined to the tube, or other air-inflatable device, as just described, it will be evident that the valve casing, inseparably united to its attaching base-forming mass, will become an integral part of the tube itself and that the tube and valve, in effect, will be a one-piece structure.

In the form of the invention shown in Figure 3, the elastic material is carried up to provide a flexible neck or stem 20, integral with the base-forming part thereof, which corresponds to that of Figures 1 and 2, within which is located a metal sleeve 21, internally threaded, as at 22, to receive the cage of a valve mechanism generally indicated at 23. The length of this sleeve is dependent, of course, upon production and other requirements, the purpose, as will be obvious, being to provide a threaded element of the requisite durability, as is obtained in metal, for the reception of the valve mechanism cage. As will be noted, the rubber or elastic mass extends within the sleeve 21 an appreciable distance and its upper end is adapted to cooperate with the base of the valve mechanism cage to render the jointure of these coacting parts leak-proof. Also, in this way, the sleeve is inseparably united with the supporting mass, by the interlocking of the circumferentially disposed depressions and ridges on the inner wall of the sleeve, as provided by the threads 22 or similarly vertically spaced undulations, that portion of the sleeve within which the elastic material extends, being embedded in the mass. If desired, of course, the outer surface of the sleeve may be properly surfaced to interlock with the rubber, as in the form of the invention shown in the preceding figures. Again, the rubber or elastic material need not be carried to the top or outer end of the sleeve externally thereof, although it is preferable to have the sleeve wholly enclosed within the rubber.

As in the other forms of the invention, the base of the unit produced in accordance with the showing of Figure 3, is integrally united to the wall of the tube or other air-inflatable device, by cementing, vulcanizing or other suitable process, it being apparent that in the application of this form of my invention to the inner tube of a vehicle tire, that the flexibility of the neck 20 will present many advantages in use, that are not possessed by one approximately rigid or with the limited yieldability of prior art devices.

While I have described my method and the structures produced thereby as they may be applied to and function with inner tubes for vehicle tires, it will be manifest, as hereinbefore pointed out, that my particular valve unit, in any of its illustrated forms or those coming within the scope of my invention, may be utilized just as advantageously, in other types of air-inflatable devices, whether of rubber or other material to which the valve unit may be integrally united to obtain the objectives to which my invention is directed.

I claim:

1. A valve unit for the inner tube of a vehicle tire, comprising a hollow metallic stem having an integral enlarged plate-like projection at its lower end extending therearound and completely enveloped by a mass of rubber hermetically attached thereto, said mass being of greatest thickness immediately adjacent said stem and extending outwardly a substantial distance circumferentially beyond the edge of said plate-like projection and of reduced thickness outwardly therefrom for attachment to the inner tube, and said stem at a point substantially inwardly from the outer edge of said projection and within the greater thickness of said mass of rubber having an integral rib extending therearound and located close to one surface of said plate-like projection, said rib being also completely enveloped by said mass of rubber, the rubber extending outwardly along the stem a substantial distance beyond the adjacent surface of said rib, whereby the circumferentially projecting portion of the rubber mass is reinforced and adhered to said enlarged plate-like projection, and the adjacent portions of the thickened mass of rubber adhered to and interlocked between the plate-like projection and rib and centrally reinforced immediately adjacent the stem, the whole being of sufficiently shallow depth to enable attachment to and use on an adjoining wall of the inner tube of a tire.

2. A valve unit for the inner tube of a vehicle tire, comprising a hollow metallic stem having an integral enlarged plate-like projection at its lower end extending therearound and completely enveloped by a mass of rubber hermetically attached thereto, said mass being of greatest thickness immediately adjacent said stem and extending outwardly a substantial distance circumferentially beyond the edge of said plate-like projection and of reduced thickness outwardly therefrom for attachment to the inner tube, the bottom of said mass extending around the lower end of said stem and merged into an upwardly-extending elongated rubber lining fitting the interior of the stem and presenting an end portion near the outer end of said stem in position to cooperate with a valve casing or the like inserted thereinto, and said stem at a point substantially inwardly from the outer edge of said projection and within the greater thickness of said mass of rubber having an integral rib extending therearound and located close to one surface of said plate-like projection, said rib being also completely enveloped by said mass of rubber, the rubber extending outwardly along the stem a substantial distance beyond the adjacent surface of said rib, whereby the circumferentially projecting portion of the rubber mass is reinforced and adhered to said enlarged plate-like projection, and the adjacent portions of the thickened mass of rubber adhered to and interlocked between the plate-like projection and rib and centrally reinforced immediately adjacent the stem, the whole being of sufficiently shallow depth to enable attachment to and use on an adjoining wall of the inner tube of a tire.

THEODORE A. HAMMOND.